United States Patent [19]

Sieben

[11] Patent Number: 4,512,470
[45] Date of Patent: Apr. 23, 1985

[54] STORAGE CASE FOR A MAGNETIC-TAPE CASSETTE

[75] Inventor: Joannes H. F. C. Sieben, Eindhoven, Netherlands

[73] Assignee: U.S. Philips Corporation, New York, N.Y.

[21] Appl. No.: 571,979

[22] Filed: Jan. 19, 1984

[30] Foreign Application Priority Data

Sep. 5, 1983 [NL] Netherlands ............... 8303077

[51] Int. Cl.³ ............... B65D 85/67; B65D 85/672
[52] U.S. Cl. ............... 206/387; 206/45.14; 206/493; 242/198
[58] Field of Search ............... 206/387, 45.14, 493; 242/198

[56] References Cited

U.S. PATENT DOCUMENTS

| | | | |
|---|---|---|---|
| 3,272,325 | 9/1966 | Schoenmakers | 206/387 |
| 3,980,255 | 9/1976 | Serizawa | 242/198 |
| 4,306,690 | 12/1981 | Izaki et al. | 206/387 |

FOREIGN PATENT DOCUMENTS 2105306 1/1982 United Kingdom ............... 206/387

Primary Examiner—William T. Dixson, Jr.
Attorney, Agent, or Firm—David R. Treacy

[57] ABSTRACT

A storage case for a magnetic-tape cassette with a front opening which is covered at the front by a cover pivotally connected to the cassette housing. The case includes at least one positioning element which extends into the front opening of the cassette and is arranged on a bottom surface of a base section near the case rear wall, for positioning the cassette. The distance at the case base between the front side of the positioning element, remote from the rear wall, to the inner side of the rear wall is greater than the distance from the wall portion of the cassette housing adjoining the positioning element to the front side of the cassette front cover. Movement of the cassette inside the case towards the rear wall is thus limited by abutment of the cassette wall portion with the positioning element, so that the front cover remains clear of the case rear wall.

10 Claims, 4 Drawing Figures

STORAGE CASE FOR A MAGNETIC-TAPE CASSETTE

BACKGROUND OF THE INVENTION

The invention relates to a storage case for a magnetic-tape cassette, which cassette comprises a housing having two parallel substantially rectangular major walls, two side walls, a rear wall, a front side with a front opening which continues in at least one major wall, and a partition which separates the front opening from the interior of the housing. Two reel hubs are juxtaposed in the housing between the major walls and are mounted for rotation about two axes of rotation which extend perpendicularly to the major walls. A part of a length of magnetic tape is wound around the reel hubs and another part of the length of tape is stretched across the front opening, which stretched part of the magnetic tape is covered, at least at the front side, by a front cover which bounds the front opening at the front side and which is pivotally connected to the housing. This storage case comprises:

(a) a base section having a rectangular bottom provided with a front edge and a rear edge, an upright rear wall which adjoins the rear edge, and a pair of spaced and parallel upright side walls which extend from the rear wall towards the front edge, (b) at least one upright positioning element arranged on the bottom, for positioning a magnetic-tape cassette whose front cover faces the rear wall of the base section when the cassette is situated in the case, and (c) a cover section having a rectangular upper wall, provided with a front edge and a rear edge, which rear edge at least substantially adjoins the rear wall of the base section in the closed position of the cover section; a front wall which adjoins the front edge of the upper wall and, in the closed position of the cover section, at least substantially adjoins the front edge of the bottom of the base section; and a pair of parallel spaced side walls, which extend from the front wall towards the rear edge, the side walls of the cover section being pivotally connected to the side walls of the base section to enable the cover section to be pivoted relative to the base section between an open and a closed position.

A storage case of this type for storing a video cassette is described in British Patent Application No. 8,223,993, which has been laid open to public inspection under No. 2,105,306. This known case is provided with a cylindrical positioning element which, after insertion of the cassette into the case, engages one of the reel hubs of the cassette. This ensures that after insertion into the known case the cassette always occupies one specific position in the case; that is the cassette faces the cover section with the upper major wall and the front cover facing the rear wall of the base section of the case. This function of the positioning element of the case is referred to as "mis-insertion protection" (protection against erroneous insertion of the cassette). The location of the positioning element, substantially halfway between the front and rear edge of the base section of the case, which is necessary for its co-operation with a reel hub of the cassette, makes it substantially impossible to enclose an insert sheet of the desired size on the bottom surface. Such an insert sheet may be required in order to enable notes about the recordings on the magnetic tape to be kept with the magnetic-tape cassette. Moreover, with the known storage case it may happen that the front cover of the cassette butts against the rear wall of the base section of the case, for example when the case is dropped, so that the pivots between the front cover and the cassette housing are subjected to an impermissible load and may break off.

SUMMARY OF THE INVENTION

It is the object of the invention to provide more room for the enclosure of an insert sheet in the base section of a storage case for a magnetic-tape cassette of the type specified, and in addition to provide an effective protection of the front cover of the cassette against shocks to which the case is subjected.

To this end the invention is characterized in that the positioning element occupies such a location on the bottom of the base section relative to the rear wall that the positioning element extends into the front opening of a magnetic-tape cassette contained in the case. The distance at the base, between that side of the positioning element which is remote from the rear wall and the inner side of the rear wall, is greater than the distance between that wall portion of the cassette partition which faces the positioning element and the front side of the front cover, in such a manner that a movement of the cassette inside the case towards the rear wall is limited by abutment of the partition with the positioning element, thereby ensuring that the front cover remains clear of the rear wall.

In this way it is possible to arrange the positioning element near the rear wall of the base section of the case, so that a fairly large area of the bottom surface is available for an insert sheet. In the case of magnetic-tape cassettes, in particular video cassettes, this is important in view of the increasing need for room to make notes. This is especially so for comparatively small cassettes, such as the recently developed internationally standardized 8-mm video cassettes, which have comparatively small dimensions. Moreover, the positioning element in the storage case in accordance with the invention also provides an effective mis-insertion protection. The ratio of the distances in the case/cassette combination ensures that, for example, impact loads to which the case is subjected are taken up by the partition of the cassette housing and not by the front cover. This is advantageous for storage cases which must be handled frequently, for example for portable recording and/or reproducing equipment, such as for example equipment using the aforementioned 8-mm video cassettes. This protection against impact loads is of particular importance for small cassettes such as the aforementioned 8-mm video cassettes, in which the pivots of the front cover are comparatively vulnerable.

A preferred embodiment of a storage case in accordance with the invention is characterized in that a ridge which extends parallel to the front edge is arranged on the bottom of the base near the front edge. The distance at the base, between that side of the ridge which faces the rear wall and that side of the positioning element which faces the rear wall, is smaller than the distance between that side of the cassette front-cover which is remote from the rear wall and the rear wall of the cassette. This difference in distance is such that a movement of the cassette in the storage case towards the front edge is limited by abutment of the rear wall of the cassette with the ridge, so that the front cover remains clear of the positioning element. In this way the rear wall of the cassette absorbs the shocks when the storage case is subjected to an impact load and the positioning element of the case cannot exert an impermissible load on the front cover of the cassette.

An effective embodiment of a storage case in accordance with the invention is characterized in that the positioning element comprises a tab which extends parallel to the rear wall of the base section. As a result of this arrangement a comparatively large area is available for an insert sheet on the bottom surface towards the front edge of the base section. The arrangement of the tab also ensures a correct engagement of the tab with the partition which bounds the front opening in the cassette housing.

In this respect a further preferred embodiment of a storage case in accordance with the invention is characterized in that the positioning element further comprises at least one rib whose upper edge is downwardly inclined from the upper edge of the tab towards the rear wall of the base section. When the cassette is removed from the storage case the front cover can readily slide over the upper edge of the rib, so that no impermissible forces can be exerted on the front cover.

In connection with the foregoing another embodiment of a storage case in accordance with the invention is characterized in that two tabs are arranged, on the bottom, spaced from and disposed in line with each other. A rib adjoins each tab at right angles to the tab, substantially halfway the length of the tab viewed, and parallel to the rear wall. This yields two positioning elements whose portions are arranged as a T, which elements can be injection-molded integrally with the base section with satisfactory rigidity. Moreover, the two positioning elements provide an effective protection of the front cover against shocks, without reducing the space which is available for an insert sheet on the bottom.

A further preferred embodiment of a storage case for a magnetic-tape cassette, in which the front cover of the cassette comprises separate interlocked outer and inner covers between which the stretched part of the magnetic tape extends, is characterized in that the upper edge of the rib extends substantially parallel to the adjoining part of the inner front cover when the case contains a magnetic-tape cassette. Thus, when the cassette is removed from the storage case the inner cover can slide past the rib in such a manner that the inner cover and, owing to the interlocking, the outer cover remain in the closed position, so that the magnetic tape cannot come into contact with the positioning element or other parts of the storage case.

An easy insertion of the magnetic tape cassette into a storage case which maintains the advantages of the ridge near the front edge of the base section, is possible in yet another embodiment of a storage case in accordance with the invention if the ridge on the bottom of the base section extends obliquely upwards from the front edge towards the rear wall, that side of the ridge which faces the rear wall extending perpendicularly to the bottom.

A suitable alignment of the cassette during insertion of a cassette and subsequently a correct lateral support for the cassette near the front corners of the case are obtained if corner portions are arranged on each side of the ridge on the bottom of the base section, which corner portions are disposed in line with the side walls and project from the ridge with pointed ends. Owing to the pointed shape of the ends of the corner portions they do not constitute obstructions for the fingers when the cassette is inserted into the case.

The lateral support of the cassette in the case is further improved if in each of the side walls of the base section a resilient arm is arranged, which arms act against the side walls of a cassette contained in the storage case.

The insertion of the cassette into the storage case and a correct positioning of the front opening relative to the positioning element are further simplified if the upper edge portions of the inner surfaces of the side walls of the base section are bevelled.

Two embodiments of the invention will be described in more detail, by way of non-limitative example, with reference to the drawings.

DESCRIPTION OF THE PREFERRED EMBODIMENTS

Figure 1:
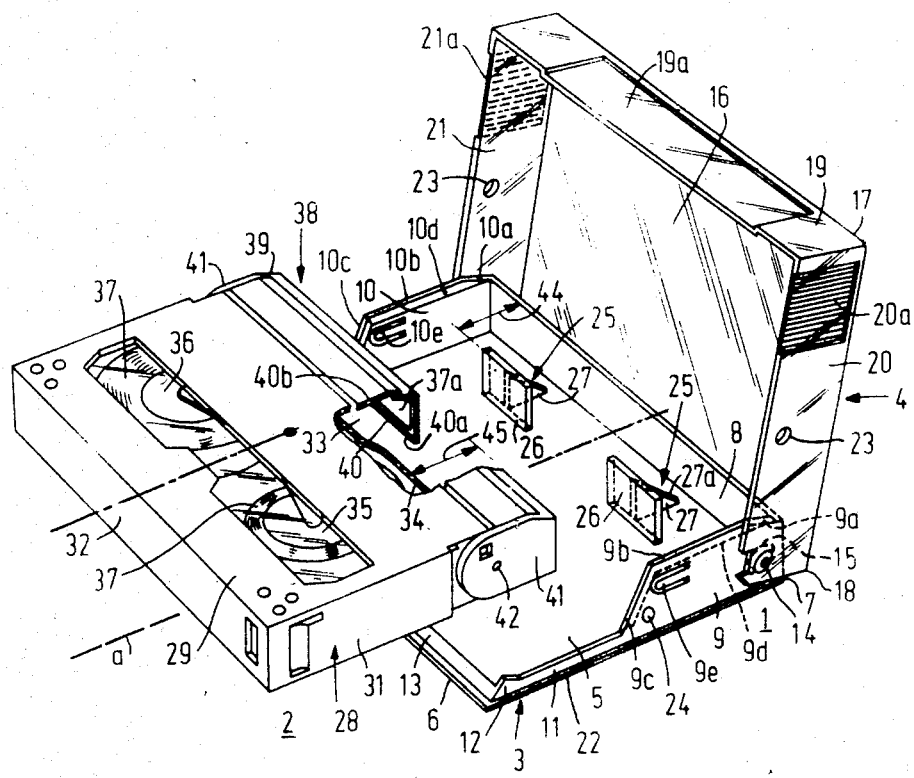
FIG. 1 is a perspective view of a storage case in accordance with the invention, an associated magnetic-tape cassette being shown outside the case.
Figure 2:
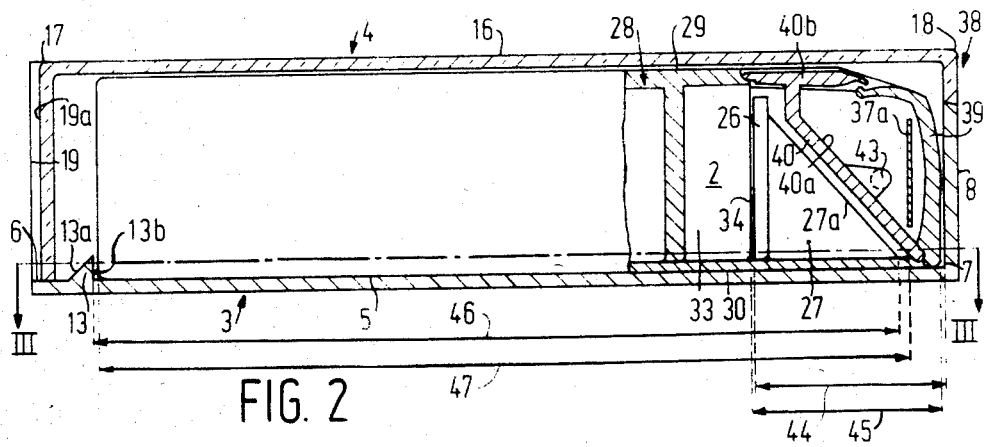
FIG. 2 is a cross-sectional view on an enlarged scale of the storage case shown in FIG. 1, which case contains a magnetic-tape cassette.
Figure 3:
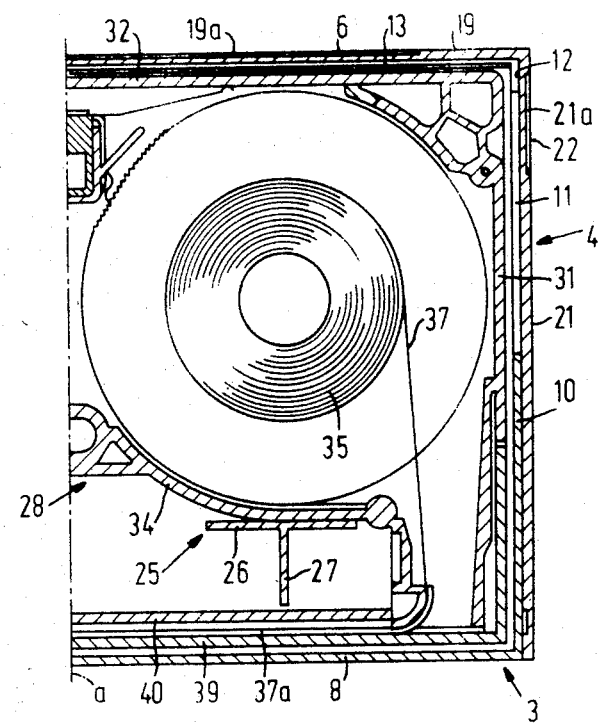
FIG. 3 is a sectional view taken on the lines III—III in FIG. 2, only one half of the case/cassette combination being shown.

FIGS. 1 to 3 show a storage case 1 for a magnetic-tape cassette, preferably a video cassette, which storage case comprises a base section 3 and a cover section 4 which is pivotally connected to the base section. The base section 3 comprises a rectangular bottom 5, provided with a front edge 6, a rear edge 7, and an upright rear wall 8 which adjoins the rear edge 7. The base section 3 further comprises a pair of spaced parallel side walls 9 and 10, whose upper edges near the rear wall 8 comprise portions 9a and 10a, respectively, which are slightly downwardly inclined towards the rear wall. Consequently, the main edge portions 9b and 10b of the side walls 9 and 10 respectively are situated slightly higher with respect to the bottom 5 than the upper edge of the rear wall 8. Substantially halfway the distance between the front edge 6 and the rear edge 7 the portions 9b and 10b adjoin downwardly inclined portions 9c and 10c respectively. On the inner sides the upper edges of the side walls 9 and 10 comprise bevelled surfaces 9d and 10d respectively, which facilitate insertion of the cassette 2 into the case 1.

The downwardly inclined portions 9c and 10c of the side walls 9 and 10 respectively adjoin ridges 11 which are disposed in line with the side walls and of which the right-hand ridge is visible in FIG. 1. The two halves of the storage case 1 are disposed mirror-symmetrically with respect to a line a through the upper surface 5, so that another ridge 11 is present on the left-hand side of the base section 3. Both ridges 11 have a substantially smaller height relative to the bottom surface 5 than the side walls 9 and 10, so that the cassette 2 can readily be inserted into the base section 3. At the end which is remote from the adjoining side wall 9 or 10, each ridge 11 adjoins a point-shaped projecting corner portion 12, which is also disposed in line with the relevant side wall 9 or 10. A ridge 13 is disposed between the corner portions 12. The ridge 13 extends parallel to the front edge 6, and has a side 13a which faces the front edge is upwardly inclined to a height which relative to the bottom 5 is preferably substantially half the height of the corner portions 12. At this location the side 13a adjoins a side 13b which extends substantially perpendicularly to the bottom 5 (see FIG. 2).

Resilient arms 9e and 10e are arranged in the side walls 9 and 10 respectively, which arms are integral with the side walls, extend substantially parallel to the bottom 5 and are connected to the side walls at their ends which are disposed nearer the rear wall 8. The arms 9e and 10e are elastic if the base section 3 is made of a suitable plastic, and have protrusions situated near the free ends which press resiliently against a magnetic-tape cassette 2 contained in the case 1.

The side walls 9 and 10 carry studs 14, which constitute pivots for the pivotal movement of the cover section 4 relative to the base section 3. On the outer sides of the side walls 9 and 10 the studs 14 are surrounded by raised portions 15 for a smooth pivotal movement of the cover section 4.

The cover section 4 comprises a rectangular upper wall 16 provided with a front edge 17 and a rear edge 18. When the cover section 4 is in the closed position as shown in FIG. 2, a comparatively short wall portion of the rear edge 18 adjoins the rear wall 8 of the base section. Moreover, the cover section 4 comprises a front wall 19 which at least near the front corners adjoins the front edge 6 of the base section 3. In order to facilitate opening of the cover section 4 a portion 19a of the front wall 19 recedes slightly in the inward direction. The receding portion 19a facilitates holding the center portion of the front edge 6 with, for example, a thumb. Similar steps have been taken for the side walls 20 and 21 of the cover section 4, in which recessed portions 20a and 21a respectively enable the lateral edges 22 of the base section 3 to be gripped. When the cover section 4 is opened the user thus has the choice to grip either the lateral edges 22 or the front edge 6 and the rear edge 7. This last-mentioned possibility is of advantage when, for example, the case is to be opened by children.

The side walls 20 and 21 are spaced from and extend parallel to one another from the upper wall 16. From the front wall 19 the side walls extend to the rear edge 18, and approximately halfway between the front edge 17 and the rear edge 18 they are provided with holes 24. In the closed position a protrusion 24 on the outer side of the side wall 9 or 10 engages the associated hole 23 to lock the cover section 4 in this position.

Preferably, the entire cover section 4 is made of a transparent plastic material, the portions 20a and 21a of the side walls 20 and 21 respectively being ribbed for a better grip on the cover section. In the present example the base section 3 is made of an opaque plastic material, but if desired this part of the storage case may also be transparent.

On the bottom 5 of the base section 3 two positioning elements 25 are arranged. These elements each comprise a tab 26 which extends parallel to the rear wall 8 of the base section 3 and a rib 27 which extends perpendicularly to the tab 26. The arrangement of the positioning elements 25 on the bottom 5 will be described in more detail hereinafter. Each rib 27 has an upper edge 27a which is downwardly inclined from the upper edge of the tab 26 towards the rear wall 8 down to the bottom 5. Thus, the positioning elements 25 each comprise portions arranged as a T. Preferably, the positioning elements 25 are integral with the plastic material of the base section 3.

As already stated, the magnetic-tape cassette 2 associated with the storage case 1, is preferably a video cassette provided with a housing 28 with two parallel substantially rectangular major walls, a major wall 29 constituting the upper wall and a major wall 30 constituting the bottom wall. Moreover, the cassette housing 28 comprises two side walls 31, a rear wall 32, and a front side with a front opening 33 through the major walls 29 and 30. The opening 33 is separated from the interior of the housing 28 by a partition 34.

Inside the housing 28 between the major walls 29 and 30 two juxtaposed reel hubs 35 and 36 are mounted for rotation about two axes of rotation which extend perpendicularly to the major walls. A part of a magnetic tape 37 is wound around the reel hubs. Another part 37a of the magnetic tape is stretched across the front opening 33, as is shown in FIG. 3. In order to shield the front opening 33 and the stretched part 37a of the magnetic tape a front-cover system 38 is arranged at the front of the magnetic-tape cassette 2, which system comprises an outer cover 39 and an inner cover 40. The outer cover 39 comprises side portions 41 which are pivotally connected to the housing 28 by means of pivots 42. The outer cover 39 effectively shields the part 37a of the magnetic tape at the front. In a manner not shown, the inner cover 40 is coupled to the outer cover 39 and is guided in guideways on the wall 34, the inner cover 40 being connected to the outer cover 39 by means of pivots 43. The coupling between the inner and the outer cover results in the inner cover 40 being pivoted along when the outer cover 39 is swung open, thereby exposing the magnetic-tape portion 37a.

It will be evident that, in the situation which occurs when the magnetic-tape cassette 2 is inserted into the case 1, the front-cover system 38 must not be able to swing open. This unwanted opening is prevented by means of a latching mechanism, not shown, which is situated near one of the side portions 41 of the outer cover 39. The inner cover 40 comprises a portion 40a, which in practice serves for shielding the magnetic tape portion 37a at the inner side of the cassette. The portion 40a is upwardly inclined from the front of the bottom wall 30 towards the rear wall 32. Near the upper wall 29 the portion 40a adjoins an upper portion 40b which is situated substantially in line with the wall 29. The upper portion 40b closes the front opening 33 at the top. The front opening 33 is freely accessible from the underside of the cassette housing.

As stated previously, insertion of the magnetic-tape cassette 2 into the storage case 1 is very simple owing to the oblique inner wall portions 9d and 10d of the side walls 9 and 10 respectively. The cassette is placed on the bottom 5, the two positioning elements 25 penetrating the front opening 33. After passing the ridge 13 the rear wall 32 of the cassette housing 28 engages the upright rear side 13b of the ridge. The elastic arms 9e and 10e urge against the respective side walls 31 of the cassette housing, so that the cassette is supported effectively in the lateral direction. The corner portions 12 ensure a correct alignment of the cassette near the front corners of the case 1. Thus, in the position shown in FIGS. 1 and 2 the cassette 2 only contacts portions of the base section 3, because the side walls 19, 20 and 21 of the cover section are situated at the outer sides of the side walls 9, 10 and the ridge 13. The presence of the positioning elements 25 is very important in this respect.

The main function of these elements during insertion is to preclude insertion of the cassette into the case with the wrong side, which function is also referred to as mis-insertion protection. Indeed, if the cassette is inserted with the major wall 29 facing down-wards, the positioning elements will butt against the portion 40b and the major wall 29, so that further insertion is impossible. This ensures that the cassette can only be inserted into the case with the upper side facing upwards.

It is also essential that the cassette in the case is protected against shocks to which the case is subjected, for example when the case/cassette combination is dropped. Such shocks, if they were transmitted to the comparatively vulnerable front-cover system, may readily lead to damaging. In particular the pivots 42 and 43 may then break off, and breakage of other parts of the inner and the outer covers is also possible. In order to preclude this, the positioning elements 25 are arranged in such a way that, in accordance with the invention, the distance at the base between that side of the tab 26 which is remote from the rear wall 8 and the inner side of the rear wall 8, indicated by the reference numeral 44 in FIGS. 1 and 2, is in principle greater than the distance between that wall portion of the partition 34 which lies against the tab 26 and the front side of the outer cover 39 bearing the reference numeral 45 in FIGS. 1 and 2. In this way a movement of the cassette in the storage case towards the rear wall 8 is always limited by abutment of the partition 34 with the tab 26, thereby ensuring that the outer cover 39 of the front-cover system remains clear of the rear wall 8. Thus, if the case 1 is subjected to a shock acting in the direction of the rear wall 8 this will not result in the outer cover 39 being subjected to an impermissible load. Consequently, the pivots 42 and 43 cannot be subjected to an impermissible load.

In this respect it is also important that in accordance with the invention, the distance at the base between that side 13b of the ridge 13 which faces the rear wall 8 and that side of the rib 27 which faces the rear wall, which distance is indicated by the reference numeral 46 in FIG. 2, is smaller than the distance between that side of the inner cassette cover 40 which is remote from the rear wall 8 and the rear wall of the cassette. Because of these relative dimensions, a movement of the cassette within the case towards the front edge is limited by abutment of the rear wall of the cassette with the upright side 13b of the ridge 13, thereby ensuring that the inner cover 40 of the front-cover system 38 remains clear of the positioning element 25.

The dimensioning steps described in the foregoing thus effectively protect the front cover system 38 of a cassette contained in the storage case against shocks to which the case is subjected. The arrangement of the positioning elements 25 near the rear wall 8 further has the advantage that between the tab 26 and the ridge 13 a comparatively large portion of the bottom 5 is available for an insert sheet. Such a sheet may be employed for recording data about the contents of the cassette; alternatively, the manufacturer of the cassette may inform the user of the specifications of the relevant cassette by means of such a sheet. In particular in the case of a comparatively small cassette, such as the aforementioned 8-mm video cassette, the room available for an insert sheet is comparatively small. Therefore, the above arrangement of the positioning elements 25 has the advantage that a substantial portion of the bottom surface is available for this purpose.

When the cassette 2 is removed from the case 1 the upper edge 27a of the rib 27 ensures that the inner cover 34 can slide smoothly over the positioning elements 25. Preferably, the upper edge 27a extends substantially parallel to the inner side of the inner cover 40 so that the obtaining forces are directed in such a way that the interlocked inner cover 40 and the outer cover 39 remain closed. This also ensures that when the cassette is removed the front-cover system 38 and the stretched part 37a of the magnetic tape are not damaged.

It is to be noted that modifications to the positioning element shown in FIGS. 1 to 3 are possible while maintaining their advantage. For example, the tabs 26 may adjoin each other so that in fact one integrated positioning element is obtained. Instead of the two ribs 27 shown a larger number of ribs may be provided in a manner not shown. Moreover, resilient arms, similar to the arms 9e and 10e in the side walls of the base section, may be arranged in the tabs 26 in a manner not shown, which arms act against the partition 34 and urge the rear wall 32 of the cassette against the upright side wall 13b of the ridge 13. Together with the arms 9e and 10e these arms ensure that a magnetic-tape cassette situated within the base section 3 cannot inadvertently drop out of the storage case, for example when the base section is turned upside down.

Figure 4:
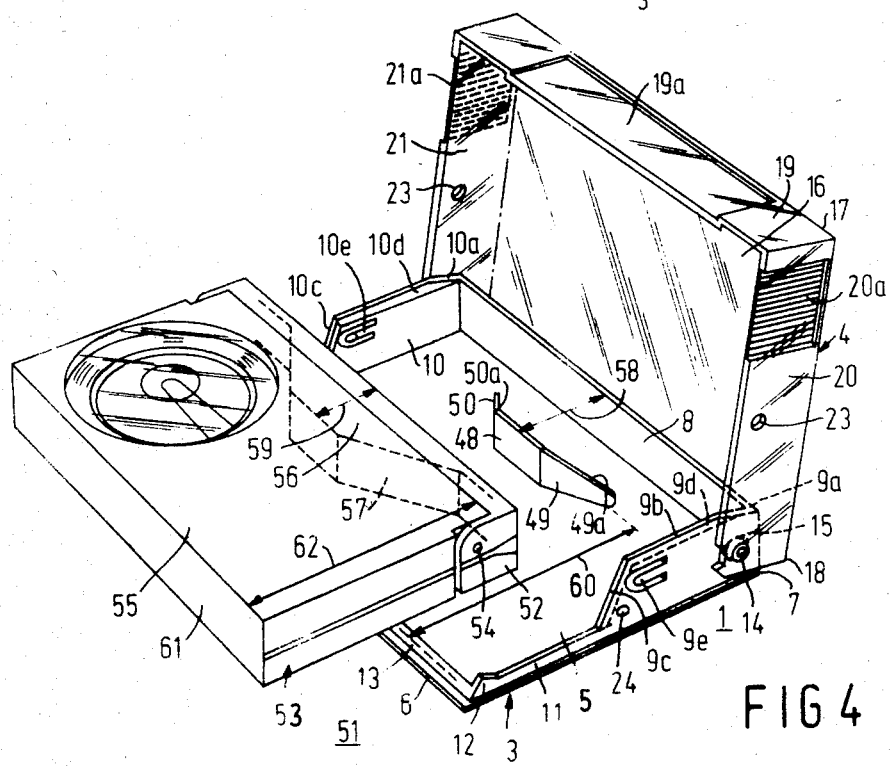
FIG. 4 is a perspective view of a second embodiment of the storage case in accordance with the invention with an associated magnetic-tape cassette shown outside the case.

A second embodiment of a storage case in accordance with the invention, shown in FIG. 4, comprises a base and cover of substantially the same construction as in the first embodiment. Corresponding parts therefore bear the same reference numerals. A difference is the construction of the positioning element on the bottom 5. In the second embodiment the positioning element comprises a tab 48 which extends parallel to the rear wall 8 and which at both ends adjoins ridges 49 and 50, whose upper edges 49a and 50a are downwardly inclined from the tab 48. The ridges 49 and 50 not only extend rearwards towards the rear wall 8 but they also extend slightly towards the side walls 9 and 10 respectively. The magnetic-tape cassette 51 associated with this storage case 1 differs from the magnetic-tape cassette 2 in respect of a number of constructional elements, the main difference being the single front cover 52. This cover is also pivotally connected to the cassette housing 53 by means of pivots 54. At the top the cassette housing 53 is closed by an upper major wall 55, which in contradistinction to the major wall 29 in the first embodiment is fully closed near a front opening 56. Thus, the front opening 56 only continues in the lower major wall of the cassette housing 53. Again the front opening 56 is bounded towards the inner side of the cassette housing 53 by a partition 57.

When the dimensioning steps described in the foregoing for the first embodiment are applied to the present embodiment it is also possible to prevent the cover 52 from being subjected to an impermissible load by abutment with the rear wall 8 when shocks are exerted on the case 1. In the present case the distance between that side of the tab 48 which is remote from the rear wall 8 and the inner side of the rear wall 8, which distance is indicated by the reference numeral 58, must be greater than the distance between the partition 57 and the outer side of the front cover 52, which distance is indicated by the reference numeral 59. This proportioning of the second embodiment also ensures that the front cover cannot contact the rear wall 8 in the event of the shocks. This is because the partition 57 will abut with the positioning element. Similarly, the distance between that side of the ridge 13 which faces the rear wall and that side of the ridge 49 which faces the rear wall 8, which distance is indicated by the reference numeral 60, is preferably smaller than the distance between that side of the front cover 52 which is remote from the rear wall 8 and the rear wall 61 of the cassette 51, which last-mentioned distance is indicated by the reference numeral 62. This also ensures that in this embodiment the positioning element cannot abut with the front cover when the storage case is subjected to the shocks.

The embodiment described with reference to FIG. 4 is not only suitable for small cassettes, but also for larger cassettes. The video cassette 53 shown in FIG. 4 is of the "Betamax" type, and is slightly larger than the cassette 2 in the first embodiment. The storage case in the second embodiment of the invention also has the advantage that a large part of the bottom 5 is available for an insert sheet, while it still affords satisfactory protection of the front cover 52.

What is claimed is:

1. A storage case, for a magnetic-tape cassette comprising
    a cassette housing having two parallel substantially rectangular major walls, two side walls, a rear wall, a front side with a front opening which continues in at least one major wall, and a partition which separates the front opening from the interior of the housing,
    two reel hubs juxtaposed in the housing between the major walls and mounted for rotation about two axes of rotation which extend perpendicularly to the major walls,
    a part of a length of magnetic tape wound around said reel hubs and another part of said length of tape stretched across the front opening, and
    a front cover which covers the stretched part of the magnetic tape at least at the front side, bounds the front opening at the front side, and is pivotally connected to the housing,
    which storage case comprises:
    (a) a base section having a rectangular bottom provided with a front edge and a rear edge, an upright rear wall which adjoins the rear edge, and a pair of spaced and parallel upright side walls which extend from the rear wall towards the front edge,
    (b) at least one upright positioning element arranged on the bottom, for positioning a magnetic-tape cassette whose front cover faces the rear wall of the base section when the cassette is situated in the case, and
    (c) a cover section having a rectangular upper wall provided with a front edge and a rear edge, which rear edge at least substantially adjoins the rear wall of the base section, in the closed position of the cover section; a front wall which adjoins the front edge of the upper wall and, in the closed position of the cover section, at least substantially adjoins the front edge of the bottom of the base section; and a pair of parallel spaced side walls, which extend from the front wall towards the rear edge, the side walls of the cover section being pivotally connected to the side walls of the base section to enable the cover section to be pivoted relative to the base section between an open and a closed position, characterized in that the positioning element occupies such a location on the bottom of the base section relative to the rear wall that the positioning element extends into the front opening of a magnetic-tape cassette contained in the case, and
    the distance at the base, between that side of the positioning element which is remote from the rear wall and the inner side of the rear wall, is greater than the distance between that wall portion of the cassette partition which faces the positioning element and the front of the front cover, in such a manner that a movement of the cassette inside the case towards the rear wall is limited by abutment of the partition with the positioning element, thereby ensuring that the front cover remains clear of the rear wall.

2. A storage case as claimed in claim 1, characterized in that a ridge which extends parallel to the front edge is arranged on the bottom of the base near the front edge, and
    the distance at the base between that side of the ridge which faces the rear wall and that side of the positioning element which faces the rear wall is smaller than the distance between that side of the cassette front cover which is remote from the rear wall and the rear wall of the cassette, in such a manner that a movement of the cassette in the storage case towards the front edge is limited by abutment of the rear wall of the cassette with the ridge, so that the front cover remains clear of the positioning element.

3. A storage case as claimed in claim 1 or 2, characterized in that the positioning element comprises a tab which extends parallel to the rear wall of the base section.

4. A storage case as claimed in claim 3, characterized in that the positioning element further comprises at least one rib whose upper edge is downwardly inclined from the upper edge of the tab towards the rear wall of the base section.

5. A storage case as claimed in claim 4, characterized by comprising:
    two tabs arranged on the bottom, which tabs are spaced from and disposed in line with each other, and
    a rib adjoining each tab at right angles to said tab substantially halfway the length of the tab viewed parallel to the rear wall.

6. A storage case as claimed in claim 4, the front cover of the cassette comprising separate interlocked outer and inner covers between which the stretched part of the magnetic tape extends, characterized in that the upper edge of the rib extends substantially parallel to the adjoining part of the inner front cover when the case contains a magnetic-tape cassette.

7. A storage case as claimed in claim 6, characterized in that the ridge on the bottom of the base section extends obliquely upwards from the front edge towards the rear wall, that side of the ridge which faces the rear wall extending perpendicularly to the bottom.

8. A storage case as claimed in claim 7, characterized in that corner portions are arranged on each side of the ridge on the bottom surface of the base section, which corner portions are disposed in line with the side walls and project from the ridge with pointed ends.

9. A storage case as claimed in claim 8, characterized in that in each of the side walls of the base section a resilient arm is arranged, which arms act against the side walls of a cassette contained in the storage case.

10. A storage case as claimed in claim 9, characterized in that the upper edge portions of the inner surfaces of the side walls of the base section are bevelled.

* * * * *